(12) United States Patent
Dong (10) Patent No.: US 9,373,193 B2
(45) Date of Patent: Jun. 21, 2016

(54) METHOD AND APPARATUS FOR DETECTING AND AVOIDING CONFLICTS OF SPACE ENTITY ELEMENT ANNOTATIONS

(75) Inventor: Futian Dong, Jiangsu (CN)

(73) Assignee: SUZHOU XINTU GEOGRAPHIC INFORMATION TECHNOLOGY CO., LTD (CN)

( * ) Notice: Subject to any disclaimer, the term of this patent is extended or adjusted under 35 U.S.C. 154(b) by 146 days.

(21) Appl. No.: 13/520,673

(22) PCT Filed: Dec. 31, 2010

(86) PCT No.: PCT/CN2010/080581
§ 371 (c)(1),
(2), (4) Date: Jul. 5, 2012

(87) PCT Pub. No.: WO2011/082649
PCT Pub. Date: Jul. 14, 2011

(65) Prior Publication Data
US 2012/0281014 A1    Nov. 8, 2012

(30) Foreign Application Priority Data

Jan. 7, 2010 (CN) .......................... 2010 1 0017272
Mar. 21, 2010 (CN) .......................... 2010 1 0144104

(51) Int. Cl.
*G06T 19/00* (2011.01)
*G06T 15/20* (2011.01)

(52) U.S. Cl.
CPC ................. *G06T 19/00* (2013.01); *G06T 15/20* (2013.01); *G06T 2219/004* (2013.01)

(58) Field of Classification Search
CPC ................................. G09G 5/32; G06T 7/004
USPC .................. 345/626, 620, 619; 715/232, 233
See application file for complete search history.

(56) References Cited

U.S. PATENT DOCUMENTS 4,521,770 A * 6/1985 Rhyne ........................... 345/589
6,330,576 B1 * 12/2001 Mochizuki et al. ........... 715/223

(Continued)

FOREIGN PATENT DOCUMENTS

CN  1479206 A   3/2004
CN  1786668 A   6/2006

(Continued)

OTHER PUBLICATIONS

Leykin et al., Automatic determination of text readability over textured backgrounds for augmented reality systems, 2004, IEEE, ACM International Symposium on Mixed and Augmented Reality, pp. 1-7.*

(Continued)

*Primary Examiner* — Maurice L McDowell, Jr.
(74) *Attorney, Agent, or Firm* — Cantor Colburn LLP (57) ABSTRACT

A method for conflict detection and avoidance of spatial entity element annotations may include transforming, according to a preset view control parameter, original coordinates of spatial data of an original element into view coordinates in a view window; rasterizing, in the view window, an element to be avoided by annotations; and analyzing an annotation of the original element according to the view coordinates, and determining a plane annotation region that satisfies a preset display condition and corresponds to the annotation as an annotation display region for the annotation.

10 Claims, 6 Drawing Sheets

(56) References Cited

U.S. PATENT DOCUMENTS

| | | | |
|---|---|---|---|
| 7,417,644 B2* | 8/2008 | Cooper et al. | 345/619 |
| 8,416,242 B1* | 4/2013 | Hutchins | 345/428 |
| 8,584,008 B1* | 11/2013 | Dulaney | 715/247 |
| 2001/0050687 A1* | 12/2001 | Iida et al. | 345/581 |
| 2002/0011941 A1* | 1/2002 | Endo et al. | 340/995 |
| 2004/0027258 A1* | 2/2004 | Pechatnikov et al. | 340/995.1 |
| 2005/0066289 A1* | 3/2005 | Leah et al. | 715/797 |
| 2006/0224950 A1* | 10/2006 | Takaai et al. | 715/512 |
| 2006/0229513 A1* | 10/2006 | Wakai | 600/407 |
| 2007/0242813 A1* | 10/2007 | Horikiri et al. | 379/93.21 |
| 2008/0052305 A1* | 2/2008 | Ohno | 707/101 |
| 2010/0021141 A1* | 1/2010 | Yamashita et al. | 386/109 |
| 2010/0135562 A1* | 6/2010 | Greenberg et al. | 382/131 |

FOREIGN PATENT DOCUMENTS

| | | |
|---|---|---|
| CN | 1955907 A | 5/2007 |
| CN | 101833779 A | 9/2010 |

OTHER PUBLICATIONS

International Search Report for International application No. PCT/CN2010/080581 mailing date of Apr. 7, 2011 with English translation.

* cited by examiner

| 0 | 0 | 2 |
|---|---|---|
| 0 |   | 1 |
| 0 | 0 | 2 |

METHOD AND APPARATUS FOR DETECTING AND AVOIDING CONFLICTS OF SPACE ENTITY ELEMENT ANNOTATIONS

CROSS REFERENCE TO RELATED APPLICATIONS

This is a U.S. national stage of application No. PCT/CN2010/080581, filed on 31 Dec. 2010. Priority under 35 U.S.C. §119(a) and 35 U.S.C. §365(b) is claimed from Chinese Application No. 2010017272.4, filed 7 Jan. 2010, and Chinese Application No. 201010144104.1, filed 21 Mar. 2010, the disclosure of which are also incorporated herein by references.

FIELD OF THE INVENTION

The present invention relates to the fields of spatial information technology, computer graphics and computer operating systems, and in particular to a method for conflict detection and avoidance of spatial entity element annotations and a device thereof.

BACKGROUND OF THE INVENTION

Generally, spatial entities are represented through electronic maps. An electronic map is a visual representation of spatial entities on an electronic display using certain hardware and software, which is a symbolization process of the spatial entities on the electronic display. The attribute and graphics information associated with a spatial entity for displaying it on an electronic map is known as an element. A point element corresponds to a point entity, a line element corresponds to a line entity, and a plane element corresponds to a plane entity.

The rapid development and extensive application of Geographic Information System (GIS) have led to an explosive increase of spatial data. Especially, the popularization of networking GIS applications has increased the need for network electronic maps displaying the huge amount of spatial entities in a network environment.

The annotation of an element is an important part of the display of the element on an electronic map. Electronic map display has to meet clarity, readability, aesthetic quality, informativeness and high-efficiency requirements. To provide proper element annotation, conflict detection and avoidance of annotations of point, line and plane elements have to be dealt with, which forbid annotations overlying each other, forbid annotations overlying point elements, and require annotations to avoid line elements if permitted.

Existing methods for conflict detection and avoidance of element annotations have the following problems. 1. Low efficiency and multiple accessing of spatial data and attribute data, which cannot meet the requirements for displaying massive spatial data efficiently on an electronic map in a network environment. For example, the conventional local search algorithm reads all related annotations before each geometric computation, and releases them after the computation. 2. Failure to meet functional requirements. For example, the grid-based method, similar to grid-based indexing, calculates the size of a cell according to the size of a character, and divides the screen into a series of cells to form screen indexes (in screen coordinates). However, annotations may have different font sizes, e.g., representative elements and names are generally larger; annotations may be tilted; and annotations are forbidden to overlie point entities and are required to avoid line entities if permitted. All these problems cannot be solved by the grid-based method. In addition, the division of a grid based on the size of a character cannot ensure annotation information of elements is displayed as much as possible, because many annotations that could have been displayed are discarded.

SUMMARY OF THE INVENTION

In view of this, the present invention provides a method for conflict detection and avoidance of spatial entity element annotations and a device thereof. Specific solutions are given below.

A method for conflict detection and avoidance of spatial entity element annotations, includes:
transforming, according to a preset view control parameter, original coordinates of spatial data of an original element into view coordinates in a view window;
rasterizing, in the view window, an element to be avoided by annotations; and
analyzing an annotation of the original element according to the view coordinates, and determining a plane annotation region that satisfies a preset display condition and corresponds to the annotation as an annotation display region for the annotation.

Preferably, the method further includes: representing the view window by a data structure according to the view control parameter, and the representing the view window by a data structure according to the view control parameter includes:
representing pixels in the view window by a raster data structure according to the view control parameter, wherein the pixels are uniform cells resulting from dividing the view window plane, each of the pixels is a basic information storage unit in the raster data structure, and coordinates and placing location of each pixel are determined according to corresponding line number and column number of the pixel in the view window; and
initializing respective raster data representing the pixels to 0.

Preferably, the rasterizing in the view window an element to be avoided by annotations includes:
analyzing an avoidance type of the element to be avoided by annotations, and
if the avoidance type is annotation overlying forbidden, assigning 1 to a bit for identifying annotation overlying forbidden in each of respective pixel values of pixels that correspond to the element to be avoided by annotations and are to be plotted when the element to be avoided by annotations is displayed in the view window;
if the avoidance type is avoid overlying if permitted, assigning 1 to a bit for identifying avoid overlying if permitted in each of respective pixel values of pixels that correspond to the element to be avoided by annotation and are to be plotted when the element to be avoided by annotation is displayed in the view window.

Preferably, the preset display condition is, in the pixel values of pixels within the plane annotation region, the bits for identifying annotation overlying forbidden are all zeros (0s), and the number of ones (1s) of the bits for identifying avoid overlying if permitted is minimum.

Preferably, the analyzing an annotation of the original element according to the view coordinates, and determining a plane annotation region that satisfies a preset display condition and corresponds to the annotation as an annotation display region for the annotation include:
generating a plane annotation region corresponding to the annotation of the original element; and judging whether the plane annotation region satisfies the preset display condition, and if so, determining the plane annotation region is the annotation display region, otherwise, determining the plane annotation region is not the annotation display region.

Preferably, after the determining a plane annotation region that satisfies a preset display condition as an annotation display region, the method further includes:

assigning, according to the avoidance type, 1 to the bit for identifying the avoidance type in each of respective pixel values of pixels in the view window that correspond to the annotation display region.

Preferably, the generating a plane annotation region corresponding to the annotation of the original element includes:

obtaining an annotation character string of the original element;

obtaining a height and a width of the annotation character string according to a textual attribute of the annotation character string; and generating a plane annotation region including the annotation character string according to an element annotation display rule.

Preferably, the judging whether the plane annotation region satisfies the preset display condition includes:

generating, according to the annotation display rule, a plane annotation region at a place with the highest annotation display priority within a range where an annotation can be displayed;

judging whether the bits for identifying annotation overlying forbidden are all 0s and the number of 1s of the bits for identifying avoid overlying if permitted is 0 in the pixel values of pixels within the plane annotation region at the place with the highest priority, and if the bits for identifying annotation overlying forbidden are all 0s and the number of 1s of the bits for identifying avoid overlying if permitted is 0, determining the plane annotation region is the annotation display region and ending the process; if the bits for identifying annotation overlying forbidden are all 0s and the number of 1s of the bits for identifying avoid overlying if permitted is not 0, storing the number of 1s;

generating a current plane annotation region in descending order of annotation display priorities; judging whether the bits for identifying annotation overlying forbidden are all 0s and the number of 1s of the bits for identifying avoid overlying if permitted is 0 in the pixel values of pixels within the current plane annotation region, and if the bits for identifying annotation overlying forbidden are all 0s and the number of 1s of the bits for identifying avoid overlying if permitted is 0, determining the current plane annotation region is the annotation display region and ending the process; if the bits for identifying annotation overlying forbidden are all 0s and the number of 1s of the bits for identifying avoid overlying if permitted is not 0, storing the number of 1s, and repeating until every region for displaying the annotation according to the display rule within the range where an annotation can be displayed has been processed; and if there is a plane annotation region having a stored number of 1s, determining a plane annotation region with the minimum number of 1s as the annotation display region; otherwise, determining there is no annotation display region for the annotation.

Preferably, after the transforming according to a preset view control parameter original coordinates of spatial data of an original element into view coordinates in a view window and before the rasterizing in the view window an element to be avoided by annotations, the method further includes:

reducing, in the view window, the original spatial data corresponding to the view coordinates.

A device for conflict detection and avoidance of spatial entity element annotations, includes:

a coordinates transforming unit, adapted to transform, according to a preset view control parameter, original coordinates of spatial data of an original element into view coordinates in a view window;

a rasterizing unit, adapted to rasterize, in the view window, an element to be avoided by annotations; and an annotation display region determining unit, adapted to analyze an annotation of the original element according to the view coordinates, and determine a plane annotation region that satisfies a preset display condition and corresponds to the annotation as an annotation display region for the annotation.

It can be seen from the technical solutions above, in the method for conflict detection and avoidance of spatial entity element annotations according to an embodiment of the present invention, the original coordinates of an element are transformed into view coordinates in a view window which is represented by a view control parameter corresponding to an actual view window that displays. Spatial relationships between the view coordinates are expressed directly in the view window, which can simplify the analyzing process. Then a region that satisfies the display condition is determined as the display region. Therefore, annotation display meets the electronic map display requirements, and the low-efficiency problem with existing analyzing methods that annotations that could have been displayed are discarded is avoided.

BRIEF DESCRIPTION OF THE DRAWINGS

For a better understanding of the technical solutions according to the embodiments of the present invention or in the prior art, accompanying drawings used in the specification are described below. Clearly, these drawings are merely some embodiments of the present invention, and those skilled in the art can obtain other drawings based on these drawings without inventive effort.

DETAILED DESCRIPTION OF THE EMBODIMENTS

The technical solutions according to the embodiments of the present invention will be described in detail hereinafter in conjunction with the accompanying drawings. Clearly, the embodiments described herein are merely some embodiments of the present invention. Any other embodiment obtained by those skilled in the art based on the embodiments described herein without inventive effort shall fall within the scope of protection of the present invention.

An embodiment of the present invention provides a method for conflict detection and avoidance of spatial entity element annotations, which includes the following steps. For convenience purposes, in the specification, the element of a spatial entity to be processed is referred to as an original element; the spatial data of the element to be processed is referred to as spatial data of the original element; the coordinates of the spatial data of the element to be processed is referred to as original coordinates of the spatial data of the original element; and the coordinate point of the spatial data of the element to be processed is referred to as an original coordinate point of the original spatial data, or directly the original coordinate point.

Figure 1:
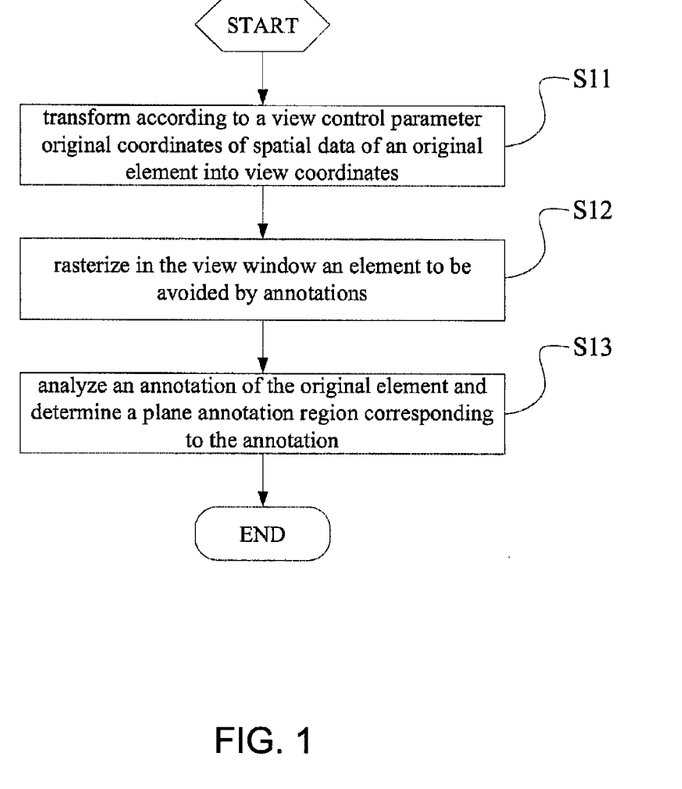
FIG. 1 is a flow chart of a method for conflict detection and avoidance of spatial entity element annotations according to an embodiment of the present invention.

FIG. 1 shows a flow chart of a method for conflict detection and avoidance of spatial entity element annotations according to an embodiment of the present invention. The method includes the following steps.

Step S11: original coordinates of spatial data of an original element are transformed into view coordinates in a view window according to a preset view control parameter.

The original coordinates of the spatial data of the original element are transformed into view coordinates in a view window, which is represented by a raster data structure according to the preset view control parameter. The preset view control parameter is a parameter corresponding to an actual view window that displays. The parameter is used to represent a view environment the same as that of the actual view window. The pixel value corresponding to a view coordinate point is represented by a preset number of bits, including but not limited to 2 bits, 4 bits or 8 bits. Raster data representing the view window are initialized to 0.

In the embodiment, the view control parameter includes a view mode and a bounding rectangle parameter of the view window. The view mode determines according to the actual view window whether the view window is preset to be in a two-dimensional mode or a three-dimensional mode. The bounding rectangle parameter of the view window determines the extent of the view window displaying a spatial entity (0, 0, ViewWidth, ViewHeight), e.g., the extent of a map display window on a computer screen, including the width of the bounding rectangle of the view window ViewWidth and the height of the bounding rectangle of the view window ViewHeight. These two parameters determine the extent of a window for displaying an image in the actual view window. For the two-dimensional view mode, in addition to the view mode and the view window bounding rectangle parameter, the view control parameter includes a rectangular inquiry range for spatial entities and a scaling ratio of spatial entities in the view, or a center coordinate point of a spatial entity in the view window and a scaling ratio of the spatial entity in the view. The center coordinate point of a spatial entity in the view window can be used in place of the rectangular inquiry range for spatial entities, as long as the original coordinates of the original spatial data can be transformed into view coordinates in the view window. The rectangular inquiry range for spatial entities refers to a range such that spatial entities within the range will be displayed in the view window, i.e., a bounding rectangle of spatial entities that can be displayed in the view window. The extent of this range may be determined according to actual display situations. For the three-dimensional view mode, in addition to the view mode and the view window bounding rectangle parameter, the view control parameter includes a view point parameter and a projection parameter. The view point parameter includes the placing location of a view point in a preset global coordinate system $O(x_o, y_o, z_o)$, where $x_o, y_o, z_o$ represent respective components of the view point in the global coordinate system, the placing location of an object viewed by the view point $A(x_a, y_a, z_a)$, and the vector of a virtual camera looking up $up(x_{up}, y_{up}, z_{up})$. The projection parameter includes orthographic projection and perspective projection. Alternatively, the view control parameter may include a view matrix and a projection matrix obtained from the parameters above, and coordinate transformation may be performed using the view matrix and the projection matrix. By a coordinate transformation method, the original coordinates of the spatial data of the original element can be transformed into the view coordinates in the view window according to the view control parameter above.

After the view control parameter is determined, the view window is represented by a data structure according to the view control parameter. The view window represented may be a physical view window that actually displays, or may be a logical view window environment generated for analysis.

When the view window is represented by a raster data structure, a two-dimensional image is represented by raster data. The view window plane is divided into uniform cells, and a cell is referred to as a pixel. A raster data structure is a grid of pixels, and each of the pixels is a basic information storage unit in the raster data structure. The coordinates and placing location of a pixel may be determined by a line number and a column number. Since raster data are arranged in a certain pattern, the placing location relationships between spatial entities that the raster data represent are expressed indirectly by line numbers and column numbers. A pixel value represents an attribute or an encoded attribute of a spatial entity.

The size of the raster data for representing the view window may be obtained from the view window bounding rectangle parameter in the view control parameter. For example, if m bytes are used for each pixel, the size of the raster data representing the view window is (ViewWidth* ViewHeight*m). The raster data for representing the view window are initialized to 0.

The original coordinates of the spatial data of the original element are transformed into the view coordinates in the view window coordinate system according to the preset view control parameter. An original coordinate point of the original spatial data corresponds to a view coordinate point in the view window coordinate system; and a view coordinate point corresponds to a pixel of the view window represented by the raster data according to the view control parameter. The view coordinates are analyzed or processed by one or a combination of the analyzing methods including: analyzing or processing the view coordinates; analyzing or processing the pixels of the view window corresponding to the view coordinate points; and analyzing or processing the pixels to be plotted when the spatial entity is displayed in the view window, so as to analyze an annotation of the original element, and determine whether there is an annotation display region corresponding to the annotation.

Step S12: an element to be avoided by annotations is rasterized in the view window.

Firstly, it is judged whether there is an element to be avoided by annotations, and if so, an avoidance type of the element to be avoided by annotations is analyzed. For example, the avoidance type of a point element is generally annotation overlying forbidden, then 1 is assigned to the bit for identifying annotation overlying forbidden in the pixel value of a pixel that corresponds to the point element and is to be plotted when the point element is displayed in the view window. For example, the avoidance type of a line element is generally avoid overlying if permitted, then 1 is assigned to the bit for identifying annotation overlying forbidden in the pixel value of a pixel that corresponds to the line element and is to be plotted when the line element is displayed in the view window.

In the embodiment, the pixels to be plotted when the element is displayed in the view window are analyzed or processed, which may include: reading the pixel value of a pixel to be plotted, judging the pixel value and assigning a value to the pixel to be plotted. The operations above may be performed on one pixel at a time or on a combination of pixels. Specific processing manners may be determined flexibly according to actual needs. As a specific operation on pixels, assigning values to the pixels may include rasterizing the spatial data of an element, reading the pixels and judging the pixel values. When a pixel is represented by multiple bits, the assignment may be carried out by assigning a value to the pixel as a whole or by assigning a value to one or more bits in the multiple bits representing the pixel. Similarly, the reading of a pixel may be carried out by reading the pixel value of a pixel as a whole or reading the value of one or more bits in the pixel. And the judging of a pixel value may be carried out by judging the pixel value of a pixel as a whole or judging the value of one or more bits in the pixel.

For example, 4 bits may be used for a pixel in the view window: a first bit for identifying whether a point element is rasterized on the pixel, a second bit for identifying whether a line element is rasterized on the pixel, a third bit for identifying whether a plane element is rasterized on the pixel, and a fourth bit for reduction of the spatial vector data. The following constants may be defined:

define point 0x0001
define line 0x0002
define region 0x0004
define simple 0x0008

As an example, a pixel corresponding to a line spatial entity may be processed as follows.

Value assignment: assigning a value to the pixel by an OR operation between the defined constant line and the pixel value, to realize rasterisation of the original spatial data. For example, line rasterisation on a pixel $P(x, y)$: $P(x, y)=P(x, y)$ line. The rasterisation of the original spatial data may be restored by an AND operation between the negated constant line and the pixel value. For example, restoration of line rasterisation on a pixel $P(x, y)$: $P(x, y)=P(x, y)$ & ~line.

Reading: the value of the raster data of $P(x, y)$ is the value of the pixel $P(x, y)$.

Judging: for example, judging whether the original spatial data is rasterized on a pixel by an AND operation between the defined constant line and the pixel value. For example, judging whether a line element is rasterized on a $P(x, y)$ may be carried out by judging whether $P(x, y)$ & line is larger than 0, and if it is larger than 0, it is determined a the line element is rasterized on the pixel $P(x, y)$; if it is equal to 0, it is determined that there is no line element that is rasterized on the pixel $P(x, y)$.

Pixel operations corresponding to other spatial entities may be carried out similarly.

Step S13: an annotation of the original element is analyzed according to the view coordinates, and a plane annotation region that satisfies a preset display condition and corresponds to the annotation is determined as an annotation display region for the annotation.

By analyzing the view coordinates corresponding to the element in the view window, it is judged whether there is a plane annotation region for displaying the annotation that satisfies the preset display condition. The preset display condition may be, in the pixel values of pixels within the plane annotation region, the bits for identifying annotation overlying forbidden are all zeros (0s), and the number of ones (1s) of the bits for identifying avoid overlying if permitted is minimum. That is, in the display region, there is no element that is forbidden from annotation overlying, and the number of elements that are required to be avoided if permitted is minimum. For example, there is no point element, and the number of line elements is minimum. The specific preset display condition may be determined according to the actual situation.

In the method for conflict detection and avoidance of spatial entity element annotations according to the embodiment, the original coordinates of the spatial data of an element are transformed into view coordinates in a view window according to a preset view control parameter. Spatial relationships between the view coordinates are expressed directly in the view window, which can simplify the analyzing process. Then a region that satisfies a display condition is determined as the annotation display region. Therefore, annotation display meets the electronic map display requirements, and the low-efficiency problem with existing analyzing methods that annotations that could have been displayed are discarded is avoided.

Figure 2:
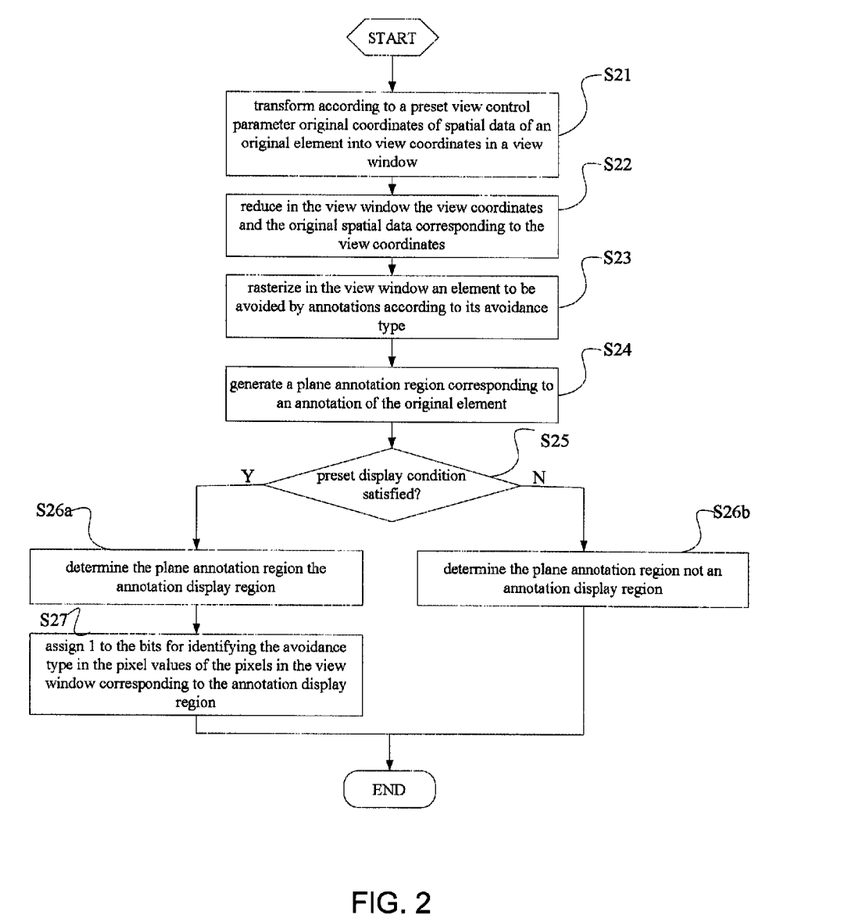
FIG. 2 is a flow chart of a method for conflict detection and avoidance of spatial entity element annotations according to another embodiment of the present invention.

FIG. 2 shows a flow chart of a method for conflict detection and avoidance of spatial entity element annotations according to another embodiment of the present invention. The method includes the following steps.

Step S21: original coordinates of spatial data of an original element are transformed into view coordinates in a view window according to a preset view control parameter.

Step S22: the original spatial data is reduced in the view window corresponding to the view coordinates.

The data that satisfy a reduction condition are reduced.

Step S23: an element to be avoided by annotations is rasterized in the view window according to an avoidance type.

According to the avoidance type, 1 is assigned to the bit for identifying the avoidance type in the pixel value of a pixel that correspond to the element and is to be plotted when the element is displayed in the view window.

In the embodiment, two bits are used for a pixel: a first bit for identifying annotation overlying forbidden, and a second bit for identifying avoid overlying if permitted. Thus in this step, 1 is assigned to the first or the second bit according to the avoidance type.

Step S24: a plane annotation region for the element is generated according to an annotation display rule within a range where an annotation can be displayed.

Step S25: it is judged whether the plane annotation region satisfies a preset display condition, and if so, proceed to step S26a; otherwise, proceed to step S26b.

Step S26a: the plane annotation region is determined as the annotation display region, and proceed to step S27.

Step S26b: the plane annotation region is determined not an annotation display region, and the process ends.

Step S27: according to the avoidance type, 1 is assigned to the bit for identifying the avoidance type in the pixel values of pixels in the view window that correspond to the annotation display region.

In most cases, the avoidance type of the element is annotation overlying forbidden, then 1 is assigned to all the bits for identifying annotation overlying forbidden in the pixel values of the pixels in the view window that correspond to the annotation display region.

The method for conflict detection and avoidance of spatial entity element annotations according to the embodiment includes an additional step of reducing the spatial data of the original element, which includes analyzing and reducing in the view window the view coordinates that are transformed into the view window, specifically: analyzing the view coordinates corresponding to the same pixel, judging whether the view coordinates satisfy a reduction condition, and reducing the original spatial data corresponding to the view coordinates that satisfy the reduction condition according to the analyzing result. The reduction is based on an actual display situation of simulated original spatial data in the view window corresponding to the view control parameter, so that lossless display of the reduced spatial data in the actual display window, and correct spatial relationships between reduced spatial data are ensured. For more information, please refer to the application titled "Method and Device for Simplifying Space Data". According to the reduction method in the embodiment, data that satisfy a reduction condition are reduced, as well as the corresponding element, therefore lossless display of the reduced elements and correctness of the spatial relationships can be ensured, and the efficiency of rasterisation of the elements in the view window can be improved.

Figure 3:
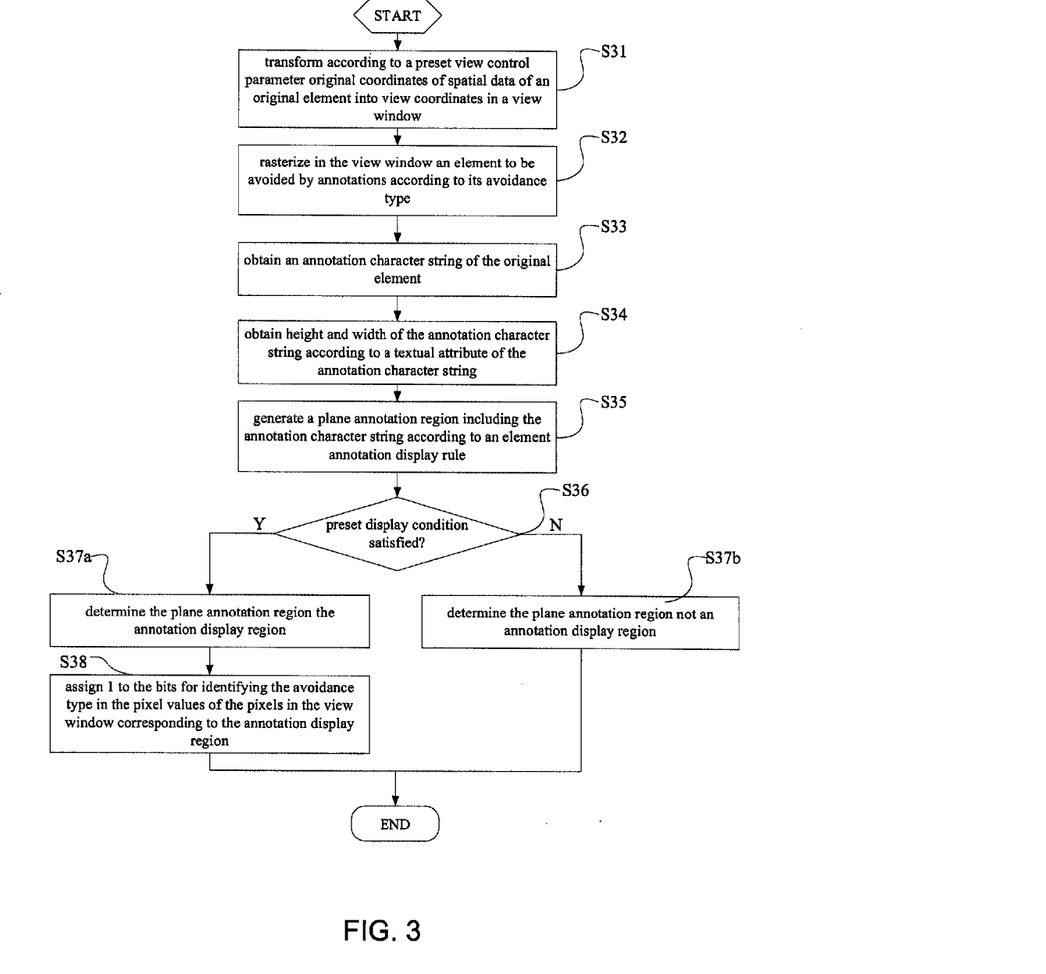
FIG. 3 is a flow chart of a method for conflict detection and avoidance of spatial entity element annotations according to another embodiment of the present invention.

FIG. 3 shows a flow chart of a method for conflict detection and avoidance of spatial entity element annotations according to another embodiment of the present invention. The method includes the following steps.

Step S31: original coordinates of spatial data of an original element are transformed into view coordinates in a view window according to a preset view control parameter.

Step S33: an element to be avoided by annotations is rasterized in the view window according to an avoidance type.

Step S33: an annotation character string of the original element is obtained.

Step S34: a height and a width of the annotation character string are obtained according to a textual attribute of the annotation character string.

Step S35: a plane annotation region including the annotation character string is generated according to an element annotation display rule.

In the embodiment, the annotation display rule includes generating plane annotation regions according to display priorities. Specifically, a plane annotation region at a placing location with the highest priority is generated firstly, then a next placing location is selected according to a preset selecting rule and a plane annotation region corresponding to the placing location is generated, until all the plane annotation regions corresponding to the placing locations within an effective selecting range are generated. The annotation display rule may be determined according to the type of the element to be analyzed, for example, a point element corresponds to a display rule for point element annotations, and a line element corresponds to a display rule for line element annotations.

The process of selecting placing locations within the effective selecting range according to the preset selecting rule may include: selecting a next placing location one after another by moving the plane annotation region at the placing location with the highest priority downward by one pixel coordinate, until the coordinate of the lower right corner of the generated plane annotation region is larger than the sum of the coordinate of the lower right corner of the point element display region and the height of the character string; then selecting a next placing location one after another by moving the plane annotation region at the placing location with the highest priority upward by one pixel coordinate, until the coordinate of the upper left corner of the generated plane annotation region is larger than the difference between the coordinate of the upper left corner of the point element display region and the height of the character string. Alternatively, the selecting of placing locations within the effective selecting range may include: selecting a next placing location one after another by moving the plane annotation region at the placing location with the highest priority upward by one pixel coordinate, and then selecting a next placing location one after another by moving the plane annotation region at the placing location with the highest priority downward by one pixel coordinate. The specific selecting order may be determined according to the actual situation.

Step S36: it is judged whether the plane annotation region satisfies a preset display condition, and if so, proceed to step S37$a$; otherwise, proceed to step S37$b$.

In the embodiment, it is determined the preset display condition satisfied when the bits for identifying annotation overlying forbidden are all 0s and the number of 1s of the bits for identifying avoid overlying if permitted is minimum in the pixel values of the pixels within the plane annotation region. Specifically, it may be judged firstly whether the bits for identifying annotation overlying forbidden are all 0s in the pixel values of the pixels within the plane annotation region, and if not, it is determined the condition not satisfied; if so, it may further be judged whether the bits for identifying avoid overlying if permitted are all 0s.

If the bits for identifying avoid overlying if permitted are all 0s, the current plane annotation region is directly determined as the annotation display region; otherwise, a plane annotation region with the minimum number of 1s in the bits for identifying avoid overlying if permitted is determined as the annotation display region.

Step S37$a$: the plane annotation region is determined as the annotation display region.

Step S37$b$: the plane annotation region is determined not an annotation display region.

Step S38: according to the avoidance type, 1 is assigned to the bit for identifying the avoidance type in the pixel values of pixels in the view window that correspond to the annotation display region.

In most cases, the avoidance type of the element is annotation overlying forbidden, then 1 is assigned to all the bits for identifying annotation overlying forbidden in the pixel values of the pixels in the view window that correspond to the annotation display region using a pixel operation described above, so as to indicate there is an annotation to be displayed in the region, and prevent the region in which an annotation is to be displayed from being determined as an annotation display region in subsequent analyzing processes, which may cause annotation overlying and affect displaying performance.

Furthermore, the judging whether the plane annotation region satisfies the preset display condition includes:

generating, according to the annotation display rule, a plane annotation region at a place with the highest annotation display priority within a range where an annotation can be displayed;

judging whether the bits for identifying annotation overlying forbidden are all 0s and the number of 1s of the bits for identifying avoid overlying if permitted is 0 in the pixel values of pixels within the plane annotation region at the place with the highest priority, and if the bits for identifying annotation overlying forbidden are all 0s and the number of 1s of the bits for identifying avoid overlying if permitted is 0, determining the plane annotation region is the annotation display region and ending the process; if the bits for identifying annotation overlying forbidden are all 0s and the number of 1s of the bits for identifying avoid overlying if permitted is not 0, storing the number of 1s;

generating a current plane annotation region in descending order of annotation display priorities; judging whether the bits for identifying annotation overlying forbidden are all 0s and the number of 1s of the bits for identifying avoid overlying if permitted is 0 in the pixel values of pixels within the current plane annotation region, and if the bits for identifying annotation overlying forbidden are all 0s and the number of 1s of the bits for identifying avoid overlying if permitted is 0, determining the current plane annotation region is the annotation display region and ending the process; if the bits for identifying annotation overlying forbidden are all 0s and the number of 1s of the bits for identifying avoid overlying if permitted is not 0, storing the number of 1s, and repeating until every region for displaying the annotation according to the display rule within the range where an annotation can be displayed has been processed; and if there is a plane annotation region having a stored number of 1s, determining a plane annotation region with the minimum number of 1s as the annotation display region; otherwise, determining there is no annotation display region for the annotation.

In the embodiment, two bits are used for a pixel: a first bit for identifying annotation overlying forbidden and a second bit for identifying avoid overlying if permitted.

Figure 4:
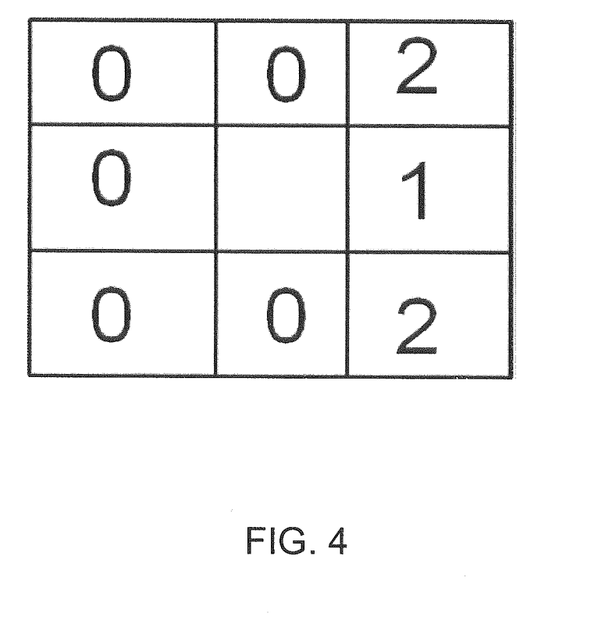
FIG. 4 is a schematic diagram of a display rule for point element annotations according to an embodiment of the present invention.

The process above will be described below in detail with a practical example. When the annotation display rule is a display rule for point element annotations, as shown in FIG. 4, a placing location 1 indicates the highest priority, a placing location 2 has a lower priority than the placing location 1, and a placing location 0 indicates annotations are forbidden at the placing location.

Assume the coordinate point at the upper left corner of a point element display region is P1(X1, Y1), and the coordinate point at its lower right corner is P2(X2, Y2), where Y2 is greater than Y1; the width of the character string is Width, the height of the character string is Height; the plane annotation region is LR(LP1, LP2), where the coordinate point at the upper left corner is LP1(LX1, LY1), and the coordinate point at the lower right corner is LP2(LX2, LY2); and the annotation display region is LR'.

Figure 5:
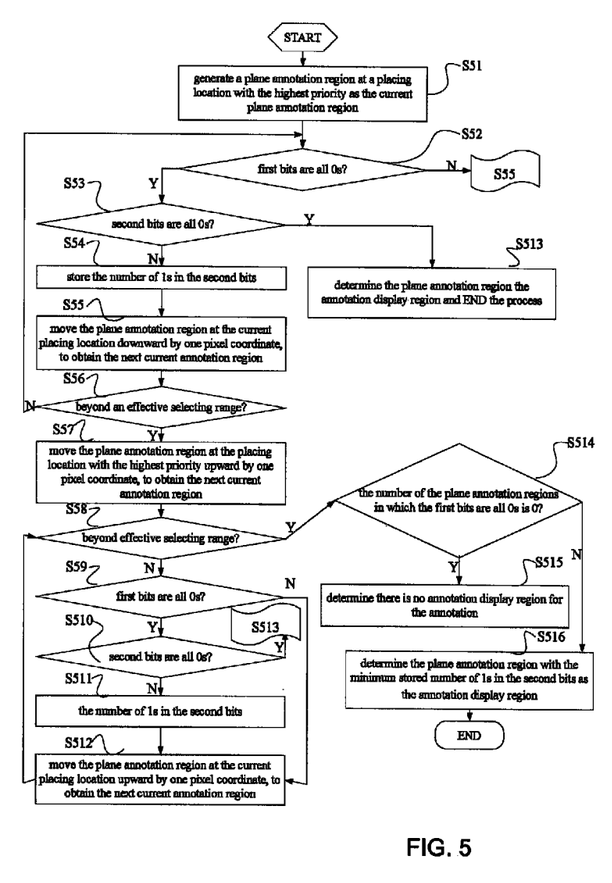
FIG. 5 is a flow chart of a method for conflict detection and avoidance of spatial entity element annotations according to another embodiment of the present invention.

FIG. 5 shows a specific process of generating plane annotation regions and determining a plane annotation region that satisfies the preset display condition as the annotation display region, which includes the following steps.

Step S51: a placing location with the highest priority is set as the current placing location, and a plane annotation region corresponding to the placing location with the highest priority is generated as the current plane annotation region.

Specifically, let LX1=X2, LY1=Y1, LX2=LX1+Width, LY2=LY1+height; and the current plane annotation region is LR(LP1, LP2).

Step S52: it is judged whether the first bits of the pixels to be plotted when the current plane annotation region is displayed in the view window are all 0s, and if so, proceed to step S53; otherwise, proceed to step S55.

The first bits being all 0s means there is no element that is forbidden from annotation overlying in the region.

Step S53: it is judged whether the second bits in the plane annotation region are all 0s, and if so, proceed to step S513; otherwise, proceed to step S54.

The second bits being all 0s, i.e., the number of 1s in the second bits being 0, means there is no element that is required to be avoided if permitted. Then the plane annotation region can be used as the annotation display region.

Step S54: the number of 1s in the second bits is stored.

Step S55: the plane annotation region at the current placing location is moved downward by one pixel coordinate, to obtain the next current plane annotation region.

That is, LY1=LY1+1, and LY2=LY2+1.

Step S56: it is judged whether the current plane annotation region is beyond an effective selecting range, and if so, proceed to step S57; otherwise, proceed to step S52.

The current plane annotation region being not beyond an effective selecting range means there is still at least one more region for displaying the annotation according to the display rule within the range where an annotation can be displayed, thus the process can be carried on.

That is, it is judged whether LY2 is larger Y2+height, and if so, it is determined the current plane annotation region is beyond the effective selecting range; otherwise, it is determined the current plane annotation region is not beyond the effective selecting range.

Step S57: the plane annotation region at the placing location with the highest priority is moved upward by one pixel coordinate, to obtain the next current plane annotation region.

That is, LY1=Y1−1, and LY2=LY1+height.

Step S58: it is judged whether the current plane annotation region is beyond the effective selecting range, and if so, proceed to step S514; otherwise, proceed to step S59.

The current plane annotation region being beyond the effective selecting range means all the regions for displaying the annotation according to the display rule have been processed within the range where an annotation can be displayed.

Step S59: it is judged whether the first bits of the pixels to be plotted when the current plane annotation region is displayed in the view window are all 0s, and if so, proceed to step S510; otherwise, proceed to step S512.

Step S510: it is judged whether the second bits in the plane annotation region are all 0s, and if so, proceed to step S513; otherwise, proceed to step S511.

Step S511: the number of 1s in the second bits is stored.

Step S512: the plane annotation region at the current placing location is moved upward by one pixel coordinate, to obtain the next current plane annotation region. Then proceed back to step S58.

That is, LY1=LY1−1, and LY2=LY2−1.

Step S513: the plane annotation region is determined as the annotation display region and the process ends.

Step S514: it is judged whether the number of the plane annotation display regions in which the first bits are all 0s is 0, and if so, proceed to step S515; otherwise, proceed to step S516.

Step S515: it is determined there is no annotation display region for the annotation.

Step S516: the plane annotation region with the minimum recorded number of 1s in the second bits is determined as the annotation display region.

Figure 6:
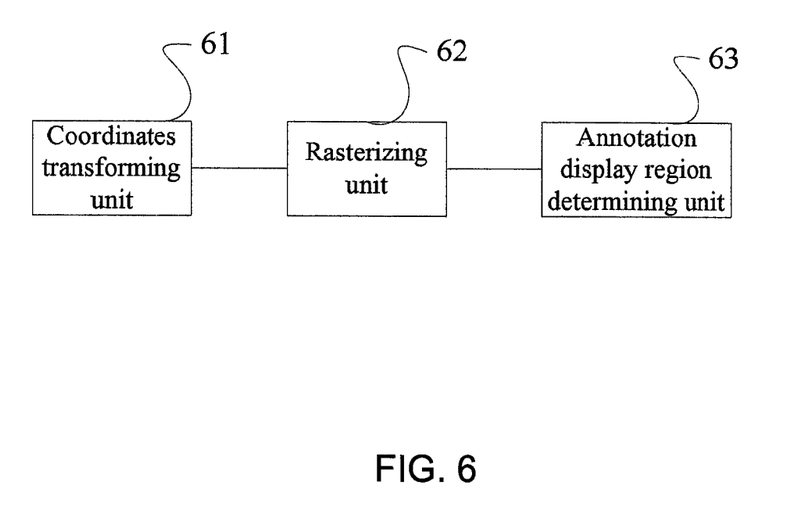
FIG. 6 is a structural diagram of a device for conflict detection and avoidance of spatial entity element annotations according to an embodiment of the present invention.

An embodiment of the present invention provides a device for conflict detection and avoidance of spatial entity element annotations. As shown in FIG. 6, the device includes: a coordinates transforming unit 61, a rasterizing unit 62 and an annotation display region determining unit 63. The coordinates transforming unit 61 is adapted to transform, according to a preset view control parameter, original coordinates of spatial data of an original element into view coordinates in a view window. The rasterizing unit 62 is adapted to rasterize, in the view window, an element to be avoided by annotations, i.e., to assign, according to an avoidance type, 1 to the bits for identifying the avoidance type in pixel values of pixels to be plotted when the element is displayed in the view window. The annotation display region determining unit 63 is adapted to analyze an annotation of the original element according to the view coordinates, and determine a plane annotation region that satisfies a preset display condition and corresponds to the annotation as an annotation display region for the annotation.

The device for conflict detection and avoidance of spatial entity element annotations according to the embodiment may operate as described below.

The coordinates transforming unit performs coordinates transformation on the original coordinate point of the spatial data of the element to be analyzed for conflict detection and avoidance, which transforms it into a view coordinate point in the view window represented by a data structure according to the preset view control parameter. On the data representing the view window, the rasterizing unit performs value assignment to the pixels to be plotted when the element to be avoided is displayed in the view window, i.e., to assigns 1 to the bits for identifying the avoidance type in the pixel values of the pixels to be plotted when the element is displayed in the view window. The annotation display region determining unit analyzes the annotation of the original element according to the view coordinates in the view window and determines whether there is a plane annotation region that satisfies a display condition and can be used as the annotation display region, i.e., judges whether in the generated plane annotation regions corresponding to the annotation there is a plane annotation region in which the bits for identifying annotation overlying forbidden are all 0s and the number of 1s in the bits for identifying avoid overlying if permitted is minimum. If there is a plane annotation region that satisfies the display condition, the plane annotation region is determined as the annotation display region, the annotation is displayed within the annotation display region, and the bits for identifying the avoidance type in the pixel values of the pixels in the view window that correspond to the annotation display region is assigned with 1. If there is no plane annotation region that satisfies the display condition, the annotation cannot be displayed.

The operation of the device for conflict detection and avoidance of spatial entity element annotations according to the embodiment correspond to the process of the method according to any of the embodiments described above, and the details are therefore omitted here.

The device for conflict detection and avoidance of spatial entity element annotations according to the embodiment of the present invention may be arranged in a computer, a mobile phone, an intelligent device, or any other device where the present invention can be implemented. It may be arranged at the server side, so that spatial data are processed before being sent to a client; or may be arranged at the client side, so that the data is processed before being sent to an actual view window; or may be arranged at both the server side and the client side, so that the data can be processed by either or both the server and the client according to an actual situation.

In the specification, the embodiments are described in a progressive manner, with each embodiment focused on the difference between the embodiment and the other embodiments. The same or like parts are described in relating embodiments. The device is described in a relatively simple manner, for it corresponds to the method and the details of it can be obtained from relating part of the method embodiments.

Those skilled in the art will also understand that the exemplary units and steps described in the embodiments herein can be implemented with hardware, computer software or both. The exchangeability of hardware components and software components is shown from the functionality description of the embodiments above. Whether to implement the functions in hardware or software is application-specific. For each application, a function described herein can be implemented by those skilled in the art in different manners, and the implementations shall not be considered beyond the scope of the present invention.

The steps of the method described in the embodiments herein can be implemented with hardware, a software module executed by a processor, or both. The software module can be arranged in a Random Access Memory (RAM), memory, a Read-Only Memory (ROM), an electrically programmable ROM, an electrically erasable programmable ROM, a register, a hard disk, a removable disk, a CD-ROM, or any other form of storage medium that is known in the field.

The description of the embodiments herein enables those skilled in the art to implement or use the present invention. Various modifications can be made to the embodiments herein by those skilled in the art, and the general principle defined herein can be applied to embodiments other than those disclosed herein without deviation from the scope of the present disclosure. Therefore, the present invention shall not be limited to the embodiments disclosed herein, but shall be in accordance with the widest scope consistent with the principles and features disclosed herein.

The invention claimed is:

1. A method for conflict detection and avoidance of spatial entity element annotations, the method comprising:
   providing a computer;
   causing the computer to perform;
   transforming, according to a preset view control parameter, original coordinates of spatial data of an original element into view coordinates in a view window;
   rasterizing, in the view window, an element which the spatial entity element annotations avoid, wherein the element includes annotations which shall be avoided; and
   analyzing an annotation of the original element, which is one of the spatial entity element annotations, according to the view coordinates, and determining a plane annotation region that satisfies a preset display condition and corresponds to the annotation as an annotation display region for the annotation, wherein determining a plane annotation region that satisfies a preset display condition is performed according to the rasterized element, wherein the rasterized element includes rasterized annotations which shall be avoided.

2. The method according to claim 1, wherein the method further comprises: representing the view window by a data structure according to the view control parameter, and wherein the representing the view window by a data structure according to the view control parameter comprises:
   representing pixels in the view window by a raster data structure according to the view control parameter, wherein the pixels are uniform cells resulting from dividing the view window plane, each of the pixels is a basic information storage unit in the raster data structure, and coordinates and placing location of each pixel are determined according to corresponding line number and column number of the pixel in the view window; and
   initializing respective raster data representing the pixels to 0.

3. The method according to claim 2, wherein the rasterizing in the view window an element which the annotations avoid comprises:
   analyzing an avoidance type of the element which the annotations avoid, and
   if the avoidance type is annotation overlying forbidden, assigning 1 to a bit for identifying annotation overlying forbidden in each of respective pixel values of pixels that correspond to the element which the annotations avoid and are to be plotted when the element which the annotations avoid is displayed in the view window;

if the avoidance type is avoid overlying if permitted, assigning 1 to a bit for identifying avoid overlying if permitted in each of respective pixel values of pixels that correspond to the element which the annotation avoids and are to be plotted when the element which the annotation avoids is displayed in the view window.

4. The method according to claim 3, wherein the preset display condition is, in the pixel values of pixels within the plane annotation region, the bits for identifying annotation overlying forbidden are all zeros (0s), and the number of ones (1s) of the bits for identifying avoid overlying if permitted is minimum.

5. The method according to claim 1, wherein the analyzing an annotation of the original element according to the view coordinates, and determining a plane annotation region that satisfies a preset display condition and corresponds to the annotation as an annotation display region for the annotation comprise:

generating the plane annotation region corresponding to the annotation of the original element; and judging whether the plane annotation region satisfies the preset display condition, and if so, determining the plane annotation region is the annotation display region, otherwise, determining the plane annotation region is not the annotation display region.

6. The method according to claim 5, wherein after the determining a plane annotation region that satisfies a preset display condition as an annotation display region, the method further comprises:

assigning, according to the avoidance type, 1 to the bit for identifying the avoidance type in each of respective pixel values of pixels in the view window that correspond to the annotation display region.

7. The method according to claim 6, wherein the generating a plane annotation region corresponding to the annotation of the original element comprises:

obtaining an annotation character string of the original element;

obtaining a height and a width of the annotation character string according to a textual attribute of the annotation character string; and generating a plane annotation region comprising the annotation character string according to an element annotation display rule.

8. The method according to claim 7, wherein the judging whether the plane annotation region satisfies the preset display condition comprises:

generating, according to the annotation display rule, the plane annotation region at a place with the highest annotation display priority within a range where an annotation can be displayed;

judging whether the bits for identifying annotation overlying forbidden are all 0s and the number of 1s of the bits for identifying avoid overlying if permitted is 0 in the pixel values of pixels within the plane annotation region at the place with the highest priority, and if the bits for identifying annotation overlying forbidden are all 0s and the number of 1s of the bits for identifying avoid overlying if permitted is 0, determining the plane annotation region is the annotation display region and ending the process; if the bits for identifying annotation overlying forbidden are all 0s and the number of 1s of the bits for identifying avoid overlying if permitted is not 0, storing the number of 1s;

generating a current plane annotation region which is different from the plane annotation region in descending order of annotation display priorities; judging whether the bits for identifying annotation overlying forbidden are all 0s and the number of 1s of the bits for identifying avoid overlying if permitted is 0 in the pixel values of pixels within the current plane annotation region, and if the bits for identifying annotation overlying forbidden are all 0s and the number of 1s of the bits for identifying avoid overlying if permitted is 0, determining the current plane annotation region is the annotation display region and ending the process; if the bits for identifying annotation overlying forbidden are all 0s and the number of 1s of the bits for identifying avoid overlying if permitted is not 0, storing the number of 1s, and repeating until every region for displaying the annotation of the original element according to the display rule within the range where an annotation can be displayed has been processed; and if the plane annotation region has a stored minimum number of 1s, determining the plane annotation region with the minimum number of 1s as the annotation display region; otherwise, determining there is no annotation display region for the annotation of the original element.

9. The method according to claim 8, wherein after the transforming according to a preset view control parameter original coordinates of spatial data of an original element into view coordinates in a view window and before the rasterizing in the view window an element which the annotations avoid, the method further comprises:

reducing, in the view window, the original spatial data corresponding to the view coordinates.

10. A device for conflict detection and avoidance of spatial entity element annotations, wherein the device comprises units implemented by a computer, the units comprising:

a coordinates transforming unit, structured to transform, according to a preset view control parameter, original coordinates of spatial data of an original element into view coordinates in a view window;

a rasterizing unit, structured to rasterize, in the view window, an element which the spatial entity element annotations avoid, wherein the element includes annotations which shall be avoided; and an annotation display region determining unit, structured to analyze an annotation of the original element, which is one of the spatial entity element annotations, according to the view coordinates, and determine a plane annotation region that satisfies a preset display condition and corresponds to the annotation of the original element as an annotation display region for the annotation of the original element, wherein whether a plane annotation region satisfies a preset display condition is determined according to the rasterized element, wherein the rasterized element includes rasterized annotations which shall be avoided.

* * * * *